(12) United States Patent
Stagg et al.

(10) Patent No.: US 11,392,891 B2
(45) Date of Patent: Jul. 19, 2022

(54) ITEM PLACEMENT DETECTION AND OPTIMIZATION IN MATERIAL HANDLING SYSTEMS

(71) Applicant: ZEBRA TECHNOLOGIES CORPORATION, Lincolnshire, IL (US)

(72) Inventors: Adrian J. Stagg, Belfountain (CA); Marco Perrella, Vaughan (CA); Jordan K. Varley, Mississauga (CA); Patrick Kennedy, Lincolnshire, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 74 days.

(21) Appl. No.: 17/088,453

(22) Filed: Nov. 3, 2020

(65) Prior Publication Data
US 2022/0138671 A1     May 5, 2022

(51) Int. Cl.
G06Q 10/00    (2012.01)
G06Q 10/08    (2012.01)
G09G 5/377    (2006.01)
G09G 5/02     (2006.01)
G06Q 30/02    (2012.01)
G06V 10/22    (2022.01)
G06V 20/20    (2022.01)
(Continued)

(52) U.S. Cl.
CPC ....... *G06Q 10/087* (2013.01); *G06Q 30/0201* (2013.01); *G06V 10/22* (2022.01); *G06V 20/20* (2022.01); *G06V 20/56* (2022.01); *G09G 5/026* (2013.01); *G09G 5/377* (2013.01); *G05D 1/0094* (2013.01)

(58) Field of Classification Search
None
See application file for complete search history.

(56) References Cited

U.S. PATENT DOCUMENTS 5,209,712 A    5/1993    Ferri
5,214,615 A    5/1993    Bauer
(Continued)

FOREIGN PATENT DOCUMENTS

CA    2835830    11/2012
CA    3028156    1/2018
(Continued)

OTHER PUBLICATIONS

Notice of allowance for U.S. Appl. No. 15/211,103 dated Apr. 5, 2017.
(Continued)

*Primary Examiner* — Martin Mushambo

(57) ABSTRACT

A method includes: obtaining, from an image sensor mounted on a mobile automation apparatus, an image representing a plurality of items on a support structure in a facility; responsive to detection of the items in the image, for each item: obtaining an item region defining an area of the image containing the item; obtaining a performance metric corresponding to the item; encoding the performance metric as a visual attribute; and generating an item overlay using the visual attribute; and controlling a display to present the image, and each of the item overlays placed over the corresponding item regions.

24 Claims, 13 Drawing Sheets

(51) Int. Cl.
*G06V 20/56* (2022.01)
*G05D 1/00* (2006.01)

(56) References Cited

U.S. PATENT DOCUMENTS

| | | | |
|---|---|---|---|
| 5,408,322 A | 4/1995 | Hsu et al. |
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |

(56) References Cited

U.S. PATENT DOCUMENTS

| | | |
|---|---|---|
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1* | 3/2009 | Linaker ............. G06Q 20/203 382/209 |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1* | 5/2013 | Herwig ................. H04W 4/029 705/26.61 |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |

(56) References Cited

U.S. PATENT DOCUMENTS

| | | |
|---|---|---|
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zang et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1* | 10/2017 | Skaff .................... G06V 10/245 |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0108134 A1 | 4/2018 | Venable et al. |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0281191 A1 | 10/2018 | Sinyayskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

Olson, Clark F., etal. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176.

(56) References Cited

OTHER PUBLICATIONS

Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-as-Possible Image Stitching with Moving DLT", 2013 Computer Vision Foundation, pp. 2339-2346.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France, [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
Duda, et al., "Use of the Hough Transformation to Detect Lines and Curves in Pictures", Stanford Research Institute, Menlo Park,

(56) References Cited

OTHER PUBLICATIONS

California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, V191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.

\* cited by examiner

ITEM PLACEMENT DETECTION AND OPTIMIZATION IN MATERIAL HANDLING SYSTEMS

BACKGROUND

In facilities supporting material handling activities, such as warehouses, retail facilities such as grocers, and the like, the physical placement of items within the facility (e.g. the location of each item within the facility) can affect the performance of the facility, for example in terms of the volume of materials handled in a given time frame. Such facilities may be large and complex, with hundreds or thousands of distinct items handled therein, however, complicating accurate assessments of current item placements and facility performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
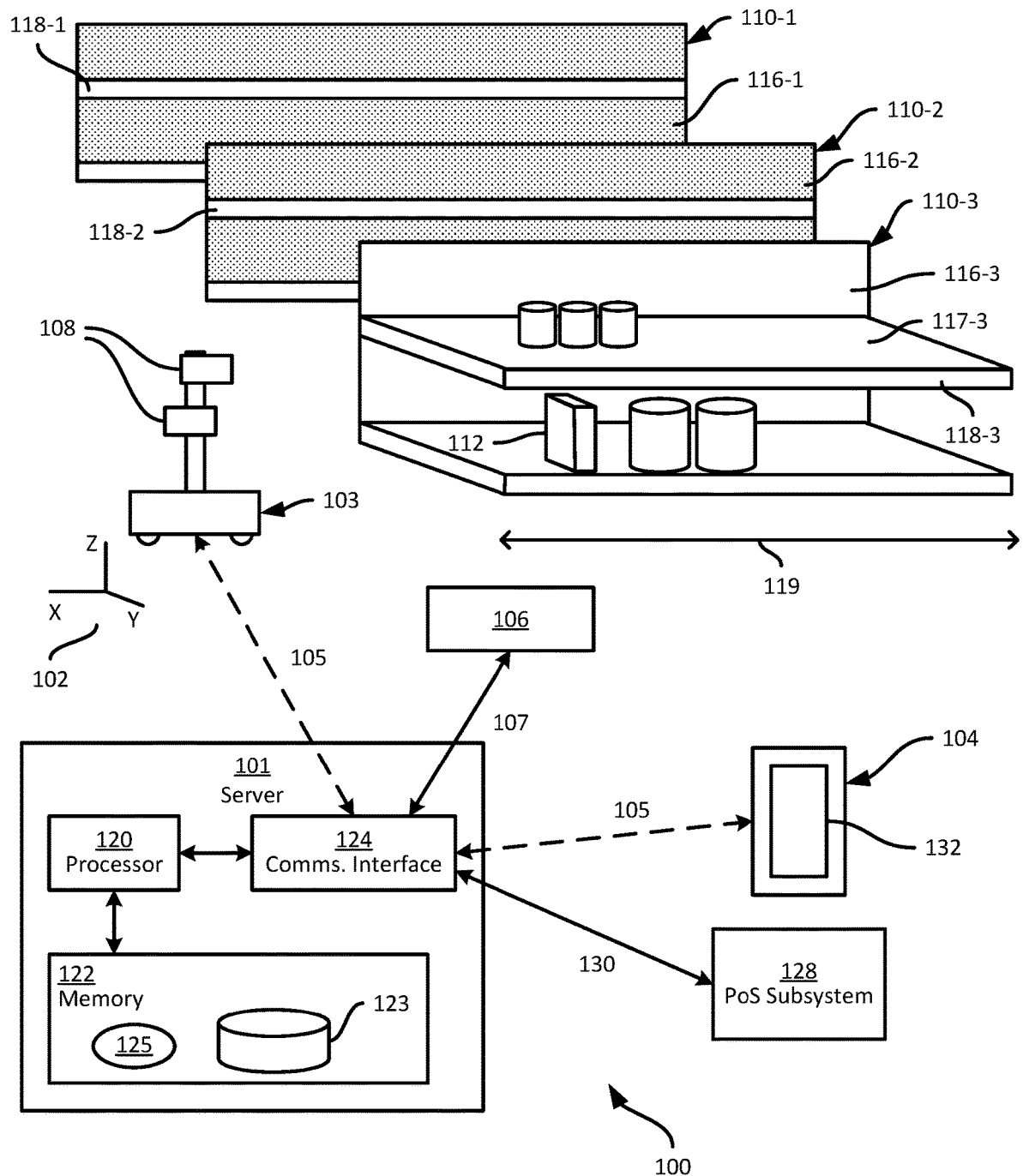
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: obtaining, from an image sensor mounted on a mobile automation apparatus, an image representing a plurality of items on a support structure in a facility; responsive to detection of the items in the image, for each item: obtaining an item region defining an area of the image containing the item; obtaining a performance metric corresponding to the item; encoding the performance metric as a visual attribute; and generating an item overlay using the visual attribute; and controlling a display to present the image, and each of the item overlays placed over the corresponding item regions.

Additional examples disclosed herein are directed to a computing device, comprising: a communications interface, and; a processor configured to: obtain, from an image sensor mounted on a mobile automation apparatus, an image representing a plurality of items on a support structure in a facility; responsive to detection of the items in the image, for each item: obtain an item region defining an area of the image containing the item; obtain a performance metric corresponding to the item; encode the performance metric as a visual attribute; and generate an item overlay using the visual attribute; and control a display to present the image, and each of the item overlays placed over the corresponding item regions.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112, which may also be referred to as items. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. A variety of other support structures may also be present in the facility, such as pegboards, tables, and the like.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 and the items 112 supported by the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103 and post-processing of captured data, such as a repository 123. The repository 123 can contain, for example, a map of the facility, operational constraints for use in controlling the apparatus 103, the image and/or depth data captured by the apparatus 103, and the like.

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products in the captured data, and detect status information corresponding to the objects). The server 101 maintains, in the memory 122, an application 125 executable by the processor 120 to perform such subsequent processing. In particular, as discussed in greater detail below, the server 101 is configured, via execution of the instructions of the application 125 by the processor 120, to obtain detected positions of the items 112 in images captured by the apparatus 103, as well as to obtain performance metrics associated with the items 112. The performance metrics, as will be discussed in greater detail below, correspond generally to rates at which the items 112 are dispensed from the facility (e.g. rates of consumption of the items 112).

Having obtained the above information, the application 125 further configures the processor 120 to generate visual representations of the performance metrics, and to detect and present relocation indicators identifying items 112 to be physically repositioned within the facility. Such repositioning may, in turn, increase the performance of the material handling operations within the facility. The server 101 repeats the above functionality periodically based on updated data captured by the apparatus 103, enabling continuous observation of current item locations and corresponding performance metrics.

In some examples, the server 101 can perform the above functions using data retrieved from other subsystems. For example, the server 101 can communicate, via the interface 124, with a performance monitoring subsystem 128, e.g. via a link 130, to retrieve certain forms of performance data. The subsystem 128 can include any one of, or any combination of, a point of sale (PoS) subsystem, a product category management and/or merchandizing planning system, or the like.

The server 101 may also transmit status notifications (e.g. notifications indicating that products are out-of-stock, in low stock or misplaced) to the client device 104 responsive to the determination of product status data. In addition, the server 101 can transmit the above-mentioned visual representations and/or relocation identifiers to the client device 104. The client device 104 includes one or more controllers (e.g. central processing units (CPUs) and/or field-programmable gate arrays (FPGAs) and the like) configured to process notifications and other information received from the server 101. For example, the client device 104 includes a display 132 controllable to present information received from the server 101.

Figure 2:
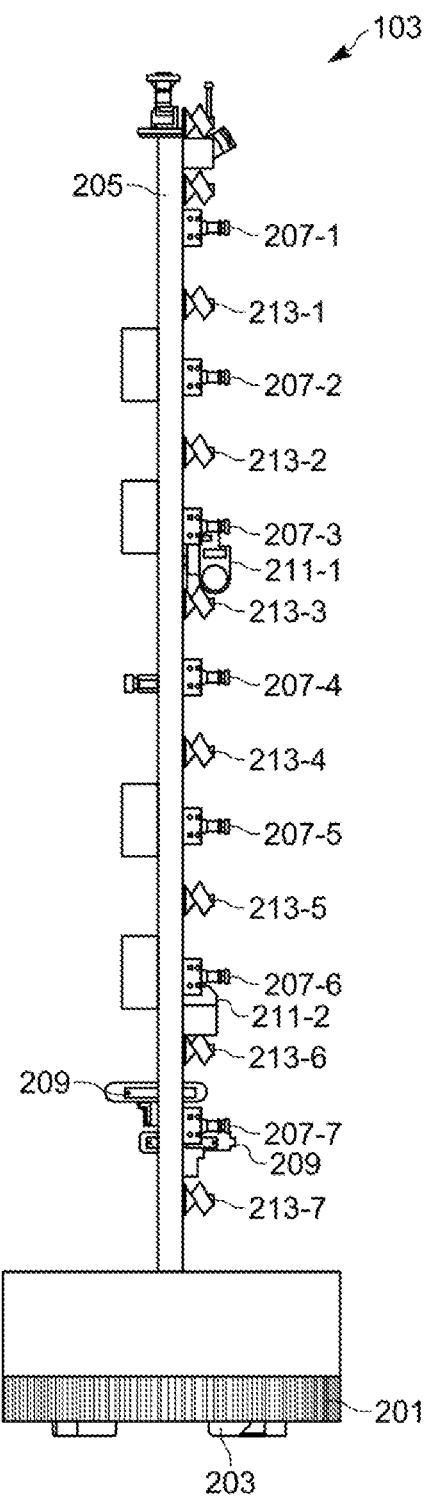
FIG. 2 is a side view of a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. The illumination assemblies 213 may be referred to collectively as an illumination subsystem. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. The apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Facilities such as retailers may measure facility performance by assessing various performance metrics associated with the items 112. For example, a quantity of each item 112 removed from the shelves 110 (e.g. for purchase by customers) over a given time period (e.g. a week, although both shorter and longer time periods may also be assessed) may be measured. The quantities of items 112 consumed may be combined with item prices, margins, shelf space (e.g. in square feet or other suitable measurement unit) assigned to an item 112, or the like to assess facility performance in financial terms.

Further, the above measurements may be employed to alter the physical placement of items 112 in order to increase facility performance. For example, certain locations, such as higher support surfaces 117 (as opposed to support surfaces 117 closer to the ground), may increase the performance metrics associated with an item placed on such support surfaces. Therefore, the performance of the facility as a whole may be improved by further increasing the performance of already high-performing items. Gathering accurate locations of items 112, however, as well as accurate measurements of performance and selection of items to relocate, is typically a time-consuming manual process. As discussed below, the system 100 enables at least partial automation of this process.

Figure 3:
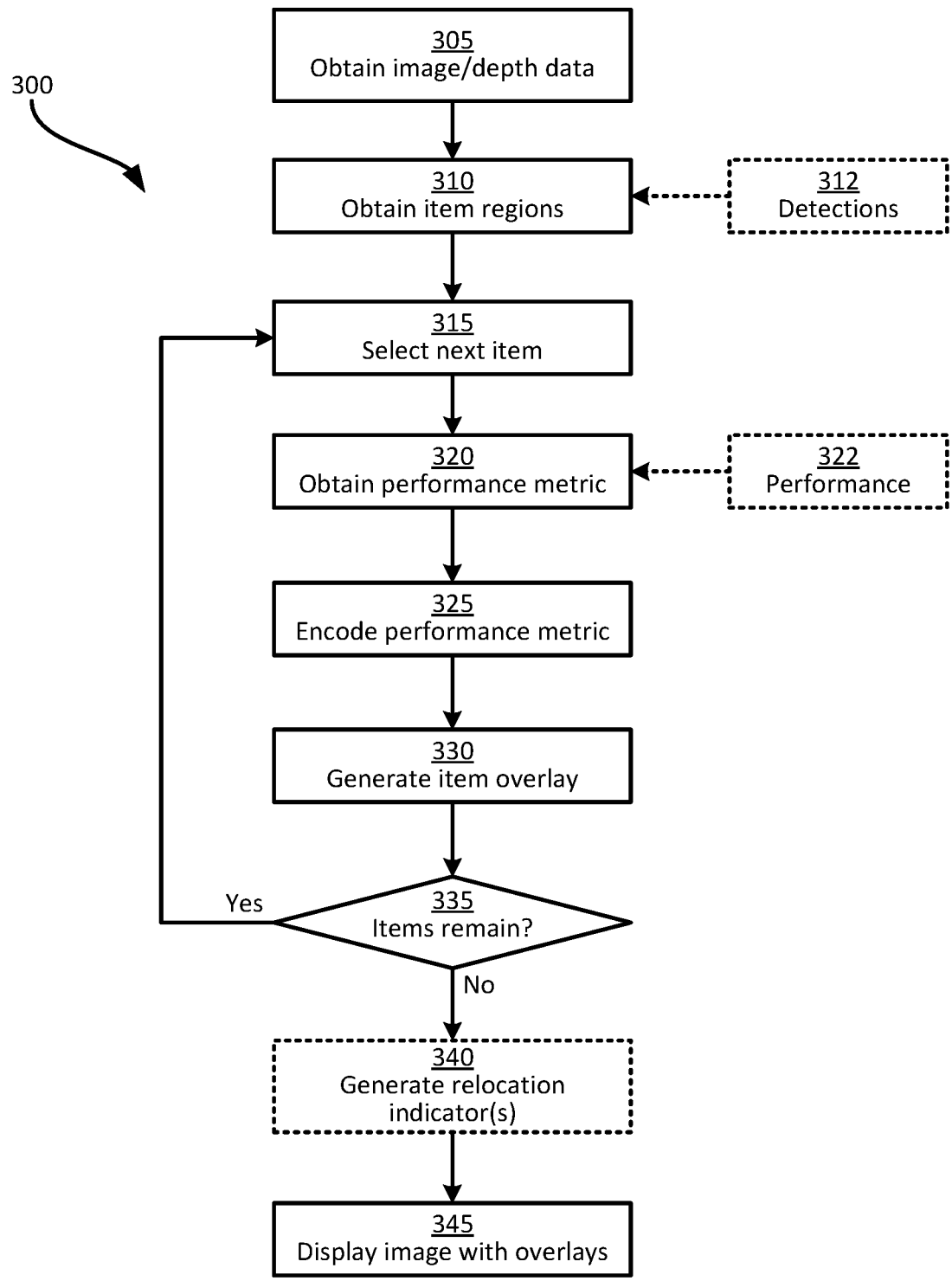
FIG. 3 is a flowchart of a method of item placement detection and optimization.

Turning to FIG. 3, a method 300 of item placement detection and optimization is illustrated. The method 300 will be discussed in conjunction with its performance in the system 100, and in particular by the server 101. In other examples, however, at least some of the functionality implemented via the method 300 can be performed by another computing device, such as the apparatus 103.

At block 305, the server 101 is configured to obtain image data, and in some examples depth data (i.e. one or more point clouds) depicting a support structure such as one or more shelves 110. The image data, in this example, includes a two-dimensional color image previously captured by the apparatus 103, e.g. while traversing an aisle containing shelves 110. The image may be a composite generated from a plurality of 2D images captured by the apparatus 103 as the apparatus 103 traversed the aisle. In other examples, the image data and/or depth data may also be captured prior to block 305 by at least one fixed camera mounted within the facility, in addition to or instead of the apparatus 103.

In examples in which the server 101 receives depth data at block 305, the depth data can include a point cloud containing a plurality of points with coordinates defined in three dimensions, e.g. according to the frame of reference 102, captured by the apparatus 103 during the above-mentioned traversal of the support structures. As with the 2D images mentioned above, the point cloud can be a composite generated from multiple point cloud captures taken as the apparatus 103 traversed the aisle. The images and point cloud obtained at block 305 may be retrieved from the repository 123, for example.

As will be apparent to those skilled in the art, the image obtained at block 305 represents a set of items 112 on the shelves 110. At block 310, the server 101 obtains item regions defining, for each item represented in the image, an area of the image that contains the item. The item regions are obtained in response to detection of the items 112 in the image, e.g. by at least one detection mechanism implemented at the server 101 (e.g. via another application distinct from the application 125) or another computing device. For example, the detection mechanisms can include an item classification mechanism employing a trained classifier (e.g. any suitable machine learning technique, including deep learning mechanisms such as neural networks and the like) to detect image features associated with particular items.

The detection mechanisms can also include a shelf edge detector, configured to return a region of the image corresponding to a shelf edge 118. The shelf edge detector can be based on any suitable combination of edge detection algorithms, for example. The detection mechanisms may also include a label detector, configured to return regions of the image corresponding to labels (e.g. price labels) that identify the items 112. The label detector can, for example, search the image (e.g. within detected shelf edge region(s)) for text and/or barcodes with predefined characteristics such as font sizes, layouts, and the like.

The item regions mentioned above can be derived from the detections of items, shelf edges, and labels. The server 101, via the execution of the application 125, may therefore generate the item regions at block 305 based on the above-mentioned item detections, or the item regions may be previously generated and stored in the repository 123, and retrieved at block 305. The server 101 can retrieve detection data 312 defining the item regions and/or the detection data mentioned above at block 310.

Figure 4:
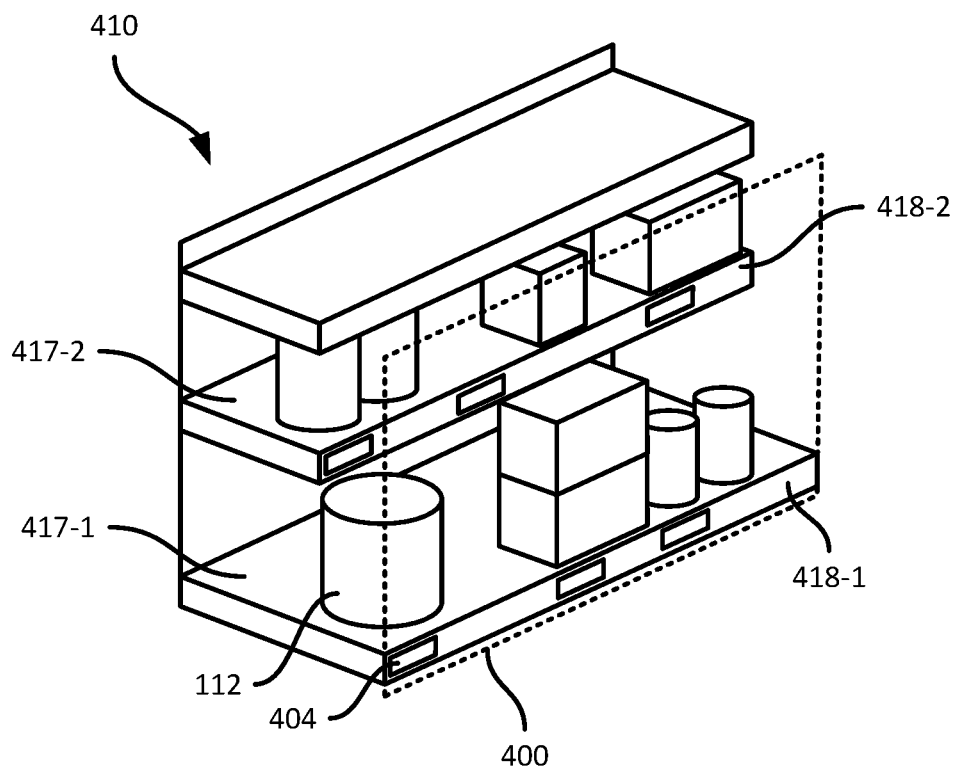
FIG. 4 is a diagram illustrating a shelf module.

Referring to FIG. 4, an example shelf module 410 is illustrated, with support surfaces 417-1 and 417-2 terminating in aisle-facing shelf edges 418-1 and 418-2, which are substantially as described above in connection with the support surfaces 117 and shelf edges 118. Each support surface 417 supports various items 112. The shelf module 410 also supports, e.g. on the shelf edges 418, a plurality of labels 404 each identifying a corresponding item 112. As will be apparent from FIG. 4, the positions of the labels 404 define spaces on the support surfaces 417 for each item 112. The image obtained at block 305 encompasses a field of view 400, and therefore represents the shelf module 410 and the items 112 thereon.

Figure 5:
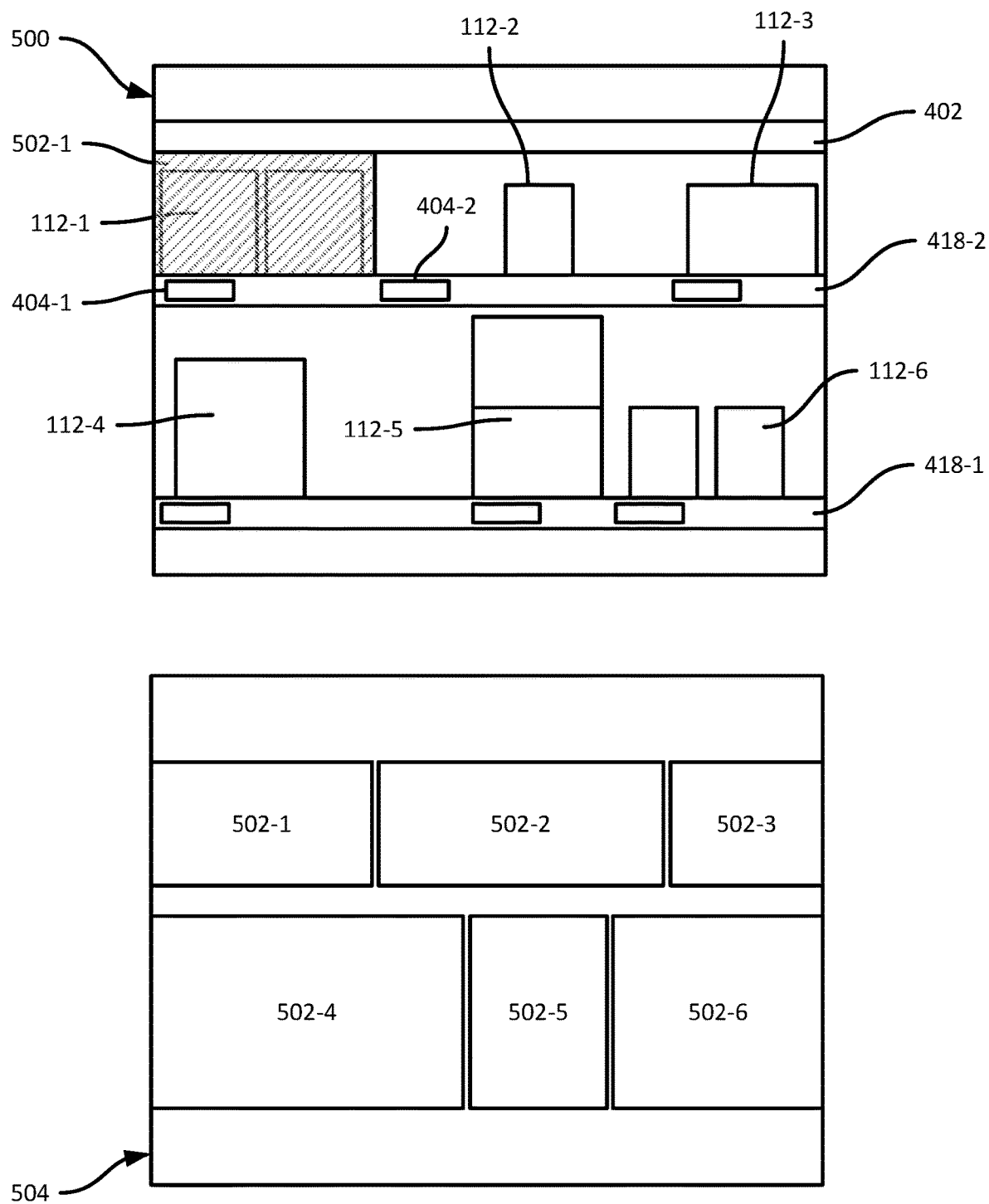
FIG. 5 is a diagram illustrating example item regions obtained at block 310 of the method of FIG. 3.

Turning to FIG. 5, an image 500 representing the shelf module 410 and items 112 encompassed within the field of view 400 is illustrated. FIG. 5 also illustrates an item region 502-1 defining an area of the image 500 containing an item 112-1. More specifically, in this example the item region 502-1 defines the maximum extent of an area containing the item 112-1, e.g. assuming the item 112-1 is fully stocked. The item region 502-1 extends from the shelf edge 418-2 to an upper structure 502 of the module 410, and from a left edge of the label 404-1 identifying the item 112-1 to a left edge of the adjacent label 404-2, which identifies an item 112-2. The remaining item regions define similar areas for the other items 112 in the image 500.

The item regions 500 are also shown in isolation within a boundary 504 of the image 500 (with the remainder of the image 500 omitted for clarity). Thus, each of the item regions 500-1, 500-2, 500-3, 500-4, 500-5, and 500-6 defines an area within the image 500 representing the maximum extent of the item 112-1, 112-2, 112-3, 112-4, 112-5, and 112-6, respectively. As will be apparent to those skilled in the art, the items 112 do not necessarily currently occupy the entirety of the corresponding item regions 500 (e.g. because some items have been removed for purchase). Each item region 502 is stored by the server 101 along with an item identifier, such as a stock-keeping unit (SKU) or other suitable identifier.

Returning to FIG. 3, having obtained the item regions 500, the server 101 is configured to obtain a performance metric for each item detected in the image (i.e. for each item region 502). The server 101 is further configured to process the performance metrics to generate overlay data for the image and/or relocation indicators identifying items to relocate, e.g. from one support surface 417 to another.

In particular, at block 315, the server 101 is configured to select an item for processing. Blocks 320 to 330 of the method 300 are performed for each item, as will be apparent in the discussion below.

In an example performance of block 315, therefore, the item corresponding to the item region 502-1 is selected. At block 320, the server 101 obtains a performance metric corresponding to the selected item. The performance metric can take a wide variety of forms. In some examples, the performance metric is an indication of revenue associated with sales of the item 112-1 over a predefined time period (e.g. a week, a month, or any other suitable time period). In further examples, the performance metric is an indication of profit margin associated with sales of the item 112-1 over the predefined time period. Other performance metrics are also contemplated, however, such as a rate of consumption of the item 112-1 independent of financial information. That is, the performance metric can include an indication of a number of instances of the item 112-1 removed from the module 410 over the time period (and therefore assumed to have been purchased), a weight of the item 112-1 removed, or the like.

Performance metric data 322 can be retrieved from the repository 123 in some examples. In other examples, performance metric data 322 can be retrieved from the PoS subsystem 128, which stores data defining sales at the facility. For example, the server 101 may request sales data from the subsystem 128 using the item identifier associated with the item region 502-1 as well as start and end dates and/or times defining the above-mentioned time period. In other examples, e.g. when the server 101 does not have access to sales data from the subsystem 128, the server 101 can generate the performance metric, as will be discussed in greater detail below.

In the present example performance of the method 300, the server 101 is assumed to retrieve the performance metric from the subsystem 128, e.g. as an amount of revenue associated with the item 112-1 over the time period. At block 325, the server 101 is configured to encode the performance metric as a visual attribute. The visual attribute includes at least one of a color value, a transparency value, a pattern selection, and the like. For example, the performance metric can be encoded to a color value by comparing the performance metric to a set of thresholds.

Figure 6:
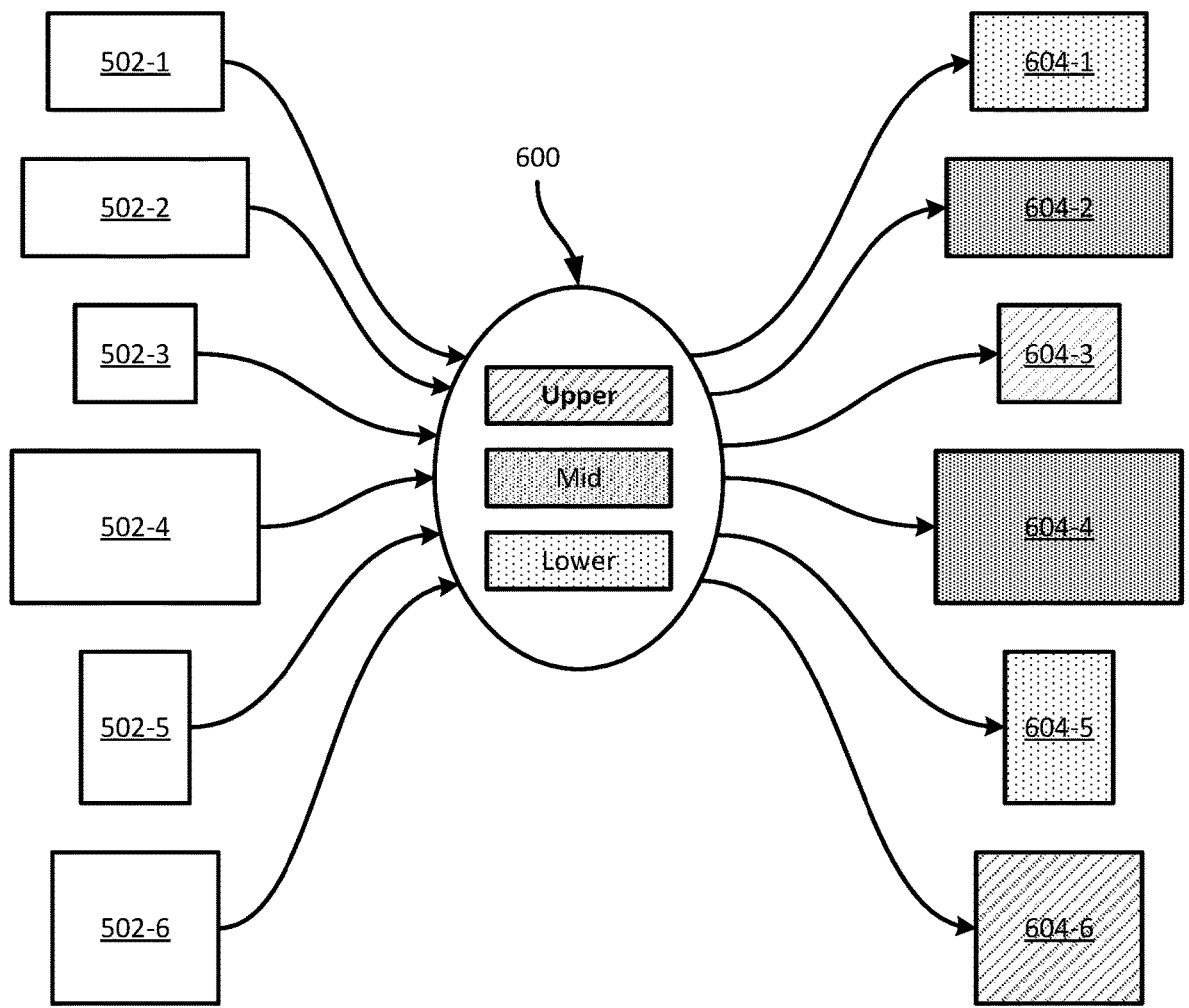
FIG. 6 is a diagram illustrating example overlay regions generated at block 330 of the method of FIG. 3.

Turning to FIG. 6, a set of encoding data 600 is illustrated, defining three visual attributes. In other examples, fewer than three, or more than three visual attributes may be defined. For example, an upper threshold (e.g. a predefined revenue threshold) corresponds to a first color (represented as diagonal hatching), such that any items 112 with performance metrics exceeding the upper threshold are encoded as the first color. The set 600 also includes a lower threshold, such that any items 112 with performance metrics below the lower threshold are encoded as a second color (represented in FIG. 6 as sparse points). Further, the set 600 includes an intermediate visual attribute definition, such that items 112 with performance metrics falling below the upper threshold and above the lower threshold are assigned a third color (represented in FIG. 6 as dense points).

Other mechanisms for encoding the performance metrics as visual attributes are also contemplated. For example, rather comparing a performance metric to discrete thresholds, the performance metric may be mapped to a color scale defined by first and second colors each associated with minimal and maximal performance metrics. Each performance metric is therefore assigned a color between the first and second colors according to the position of the performance metric relative to the minimal and maximal performance metrics.

Returning to FIG. 3, at block 330, the server 101 is configured to generate an item overlay corresponding to the item selected at block 315. In particular, the item overlay can have the same dimensions as the corresponding item region 502, as well as the visual attribute(s) encoded at block 325. The right side of FIG. 6 illustrates overlay regions 604, corresponding to the item regions 500 of FIG. 5 and assigned colors (represented as the above-mentioned patterns) based on encoding of their respective performance metrics via the encoding data 600. That is, the regions overlay 604-3 and 604-6 are assigned the first color, the overlay regions 604-2 and 604-4 are assigned the third color, and the region 502-1 and 500-5 are assigned the second color. As will now be apparent, FIG. 6 illustrates multiple performances of blocks 320-330.

At block 335, the server 101 determines whether there remain items 112 to be processed that correspond to the item regions 500 obtained at block 310. Blocks 315, 320, 325, and 330 are repeated until all items for which an item region 502 was obtained have been processed (i.e. to generate a corresponding item overlay).

Following a negative determination at block 335, the server 101 may proceed to block 340. At block 340, the server can generate the above-mentioned relocation indicators. The generation of relocation indicators is optional, and may therefore be omitted. Generation of relocation indicators will be discussed below, and in the present example is therefore omitted.

Figure 7:
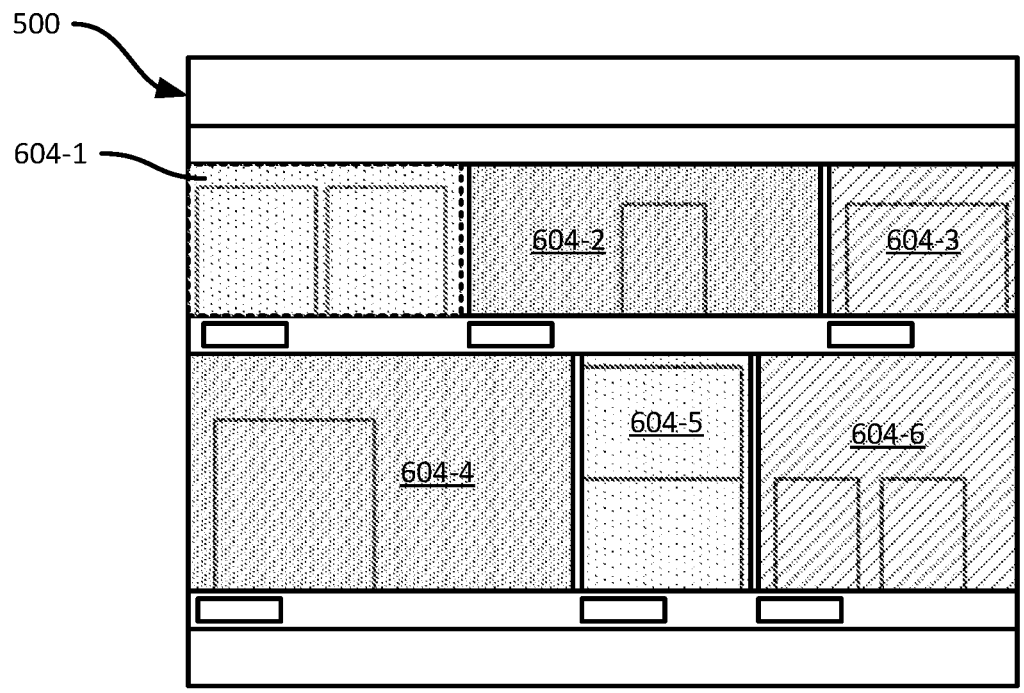
FIG. 7 is a diagram illustrating an example performance of block 345 of the method of FIG. 3.

At block 345, the server 101 is configured to control a display to present the image 500 obtained at block 305, along with the overlay regions generated via successive performances of blocks 315-330. Turning to FIG. 7, the image 500 is shown with the overlay regions 604 overlaid thereon. As seen by comparing FIGS. 5 and 7, the overlay regions 604 define the same areas as the item regions 500. Further, the overlay regions 604 have the visual attributes defined by the set of encoding data 600 discussed above. FIG. 7, in other words, illustrates a heat map depicting performance metrics associated with the items 112 via color and/or pattern, or other suitable visual attributes.

The overlay of the image 500 and the regions 604 generated at block 345 may be presented by transmission to the client device 104 (e.g. for presentation on the display 132), by presentation on a display local to the server 101, or the like. At block 345, the server 101 may also present the relocation indicators, when block 340 is performed.

Figure 8:
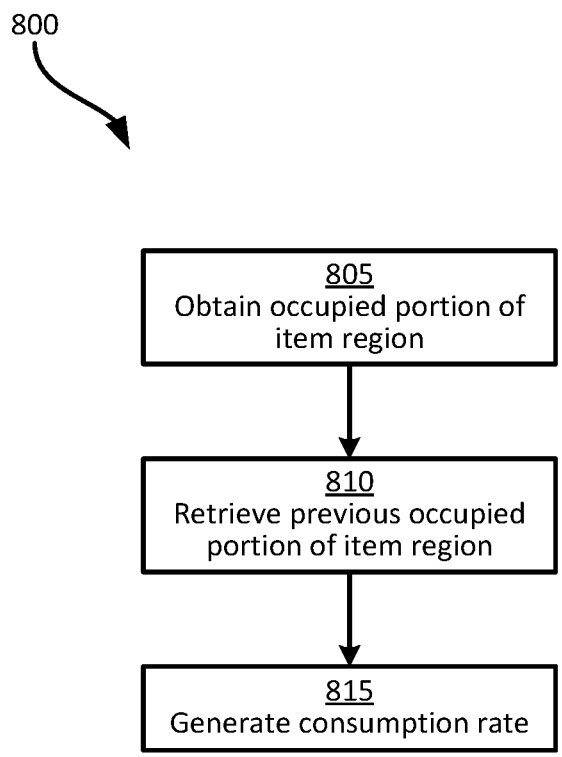
FIG. 8 is a flowchart of a method for generating performance metrics.
Figure 9:
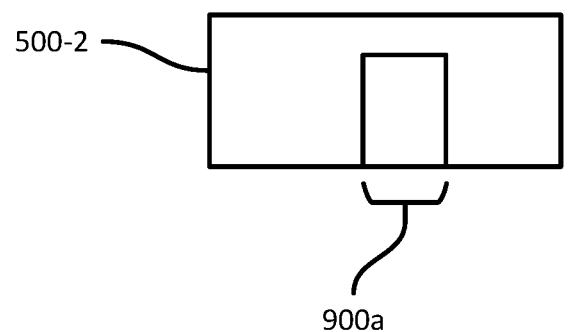
FIG. 9 is a diagram illustrating an example performance of the method of FIG. 9.
Figure 9:
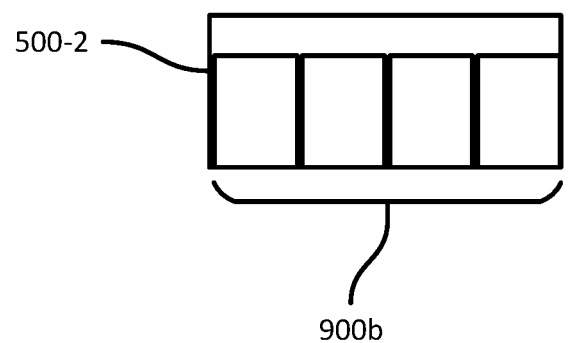

Turning to FIG. 8, a method 800 for generating performance metrics at block 320 is illustrated. As noted above, the performance metrics in the form of sales data may not be available to the server 101 in some examples. The server 101 can therefore generate performance metrics from the image 500 and item detections. In particular, at block 805, the server 101 obtains an occupied portion of the item region. For example, along with the item regions 500, the server 101 may obtain (e.g. at block 310) item bounding boxes, indicating the portion(s) of each item region 502 that are actually occupied by the relevant item. For example, turning to FIG. 9, the item region 502-2 is illustrated, along with an occupied region 900a that corresponds to the item 112-2 shown in FIG. 5. The server 101 can determine the occupied portion, for example, by determine a fraction of the area of the region 502-2 represented by the region 900a. In the present example, that fraction is about 20%. In other embodiments, in which depth data is also available, an occupied portion of a volume corresponding to the item region 502-2 may be determined.

At block 810, the server 101 is configured to retrieve a previous occupied portion of the same item region (e.g. the region 502-2). That is, the server 101 retrieves data from a previous performance of block 805, e.g. from the repository 123. The previous version retrieved corresponds to a predefined time period before the image 500 was captured. Turning again to FIG. 9, a portion of an earlier image, showing four instances of the item 112-2 is also shown. The four instances of the item 112-2 define an occupied region 900b, representing about 80% of the item region 502-2. In other words, during the time period separating the capture operations that yielded the two depictions of the item region 502-2 shown in FIG. 9, three instances of the item 112-2 have been consumed Returning to FIG. 8, at block 815 the server 101 generates a consumption rate based on the current occupied portion (e.g. about 20% in the above example), the previous occupied portion (e.g. about 80% in the above example), and the time period separating the current and previous occupied regions. For example, if the time period is five days, the consumption rate is 12% per day. In some embodiments, item dimension data and/or facing detection data enables the server 101 to determine a number of items (e.g. 3 items per five days).

Figure 10:
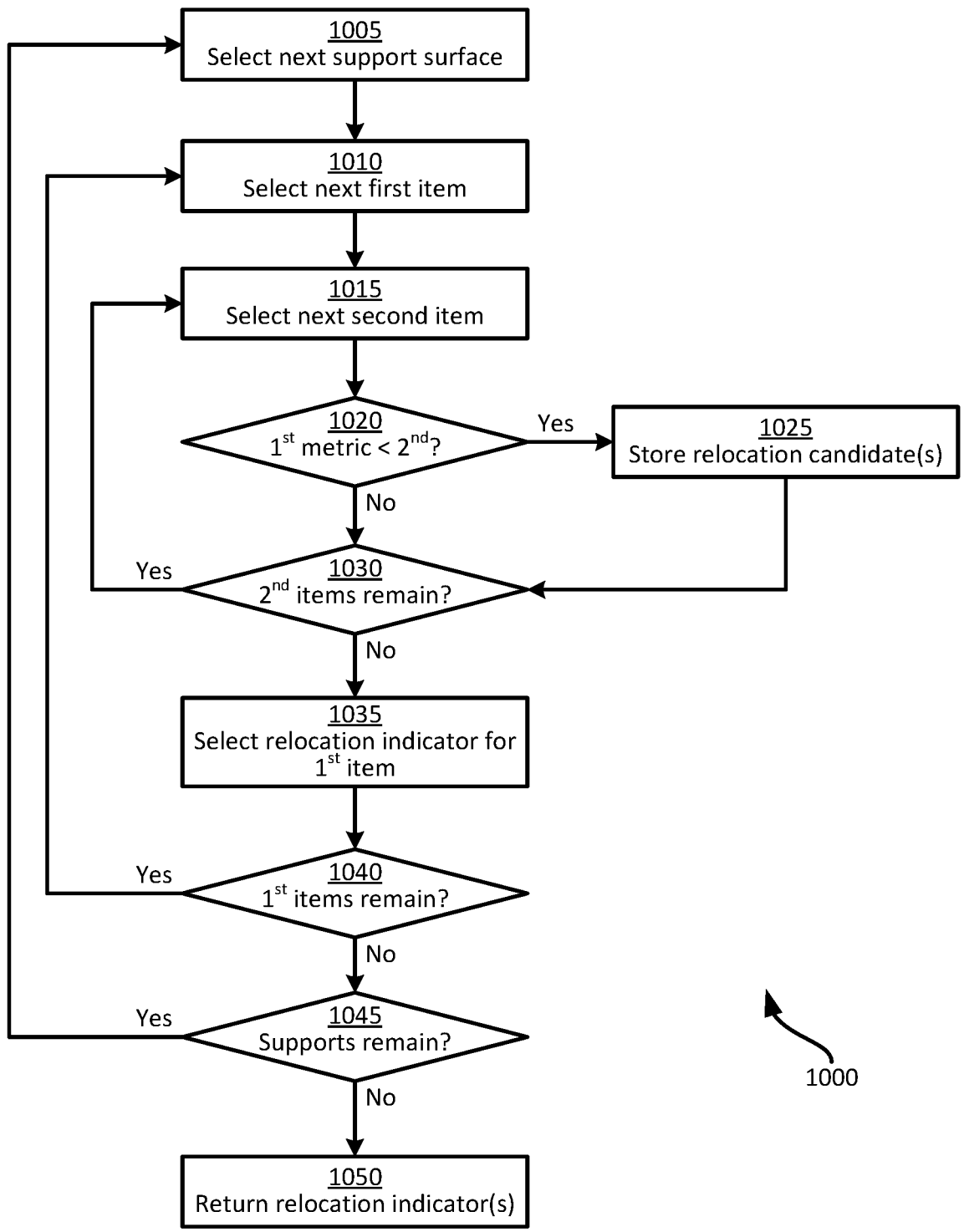
FIG. 10 is a flowchart of a method of generating relocation indicators.

Turning now to FIG. 10, generation of item relocation indicators will be discussed in greater detail. As will be apparent to those skilled in the art, the performance metrics of the items 112 (e.g. the revenue generated by the items 112 may depend in part on the positioning of the items 112 within the facility. In particular, the height of the support surface 417 on which an item 112 is placed may affect the performance metric of that item 112, with support surfaces 417 further above the ground increasing performance metrics compared to support surfaces 417 closer to the ground. In other words, it may be advantageous to place items 112 with greater performance metrics on support surfaces 417 with higher values (i.e. further above the ground), in order to further increase the performance of such items 112. The server 101 can be configured, at block 340, to perform a method 1000 to identify pairs of items 112 to relocate by swapping locations with one another, e.g. in order to place higher-value items 112 on higher support surfaces 417. The performance of the method 1000 will be discussed in conjunction with the image 500 and overlays 604 described earlier.

At block 1005, the server 101 selects a support surface to evaluate. In the present example, the method 1000 serves to identify opportunities to relocate high-value items to higher support surfaces 417. The method 1000 therefore begins with the second support surface from the ground, which in the present example is the support surface 417-2.

At block 1010, the server 101 selects a first item 112. The first item is the item 112 that will be compared to a plurality of items on the lowest support surface (i.e. the support surface 417-1 in this example). In this example, the first item is the item 112-1 (corresponding to the overlay region 604-1, which indicates that the item 112-1 is a low-value item). At block 1015, the server 101 selects a second item 112. The second item is selected from the lower support surface 417-1. For example, the second item may be the item 112-4.

At block 1020, the server 101 determines whether the performance metric of the first item is smaller than the performance metric of the second item. In the present example, the determination is affirmative, as the item 112-4 (as indicated by the overlay region 604-4) has a greater value than the item 112-1. Following an affirmative determination at block 1020, the server 101 stores the first and second item as a relocation candidate pair at block 1025, and then proceeds to block 1030.

At block 1030, the server 101 determines whether additional second items remain to be compared to the first item from block 1010. In the present example, the non-active support surface (i.e. the support surface 417-1) contains two more items (the items 112-5, and 112-6), and the determination is therefore affirmative. The server 101 therefore proceeds to block 1015 and selects the next second item, e.g. the item 112-5. The comparison at block 1020 is repeated, and in the present example is negative because the items 112-1 and 112-5 both have low values. In this example, the performance metrics of the items 112 are being compared using the visual attributes described earlier, to simplify the comparison, but in some examples the original performance metrics may be compared, which may lead to a determination that the item 112-1, despite having been assigned a low-value visual attribute, nevertheless has a greater performance metric than the item 112-5.

A third performance of blocks 1015 and 1020 leads to a determination that the item 112-6 has a greater performance metric than the item 112-1. At block 1025 another relocation candidate pair (consisting of the items 112-1, and 112-6) is therefore stored. Following a negative determination at block 1030, because each of the items 112 on the support surface 417-1 have been compared to the item 112-1, the server 101 proceeds to block 1035.

At block 1035, the server 101 selects a relocation indicator for the first item (i.e. the item 112-1 in this example). When there are multiple candidate pairs, as in this example performance, the paired items 112 themselves may be compared. Thus, in this example the items 112-4 and 112-6 are compared in the same manner as block 1020, with the higher-value item being selected. The relocation indicator selected at block 1035 therefore pairs the items 112-1 and 112-6.

At block 1040, the server 101 determines whether any first items remain. That is, the server 101 determines whether any items 112 on the support surface selected at block 1005 remain to be processed. The process above is repeated for each such item, and following a negative determination, at block 1045 the process is once again repeated for each item on the next support surface. In this example, the first determination at block 1045 is negative because only two support surfaces 417 are present. However, if the module 410 included a third support surface 417 above the support surface 417-2, the determination at block 1045 would be affirmative, and each item 112 on the third support surface would be compared with every item on the first and second support surfaces 417-1 and 417-2.

Figure 11:
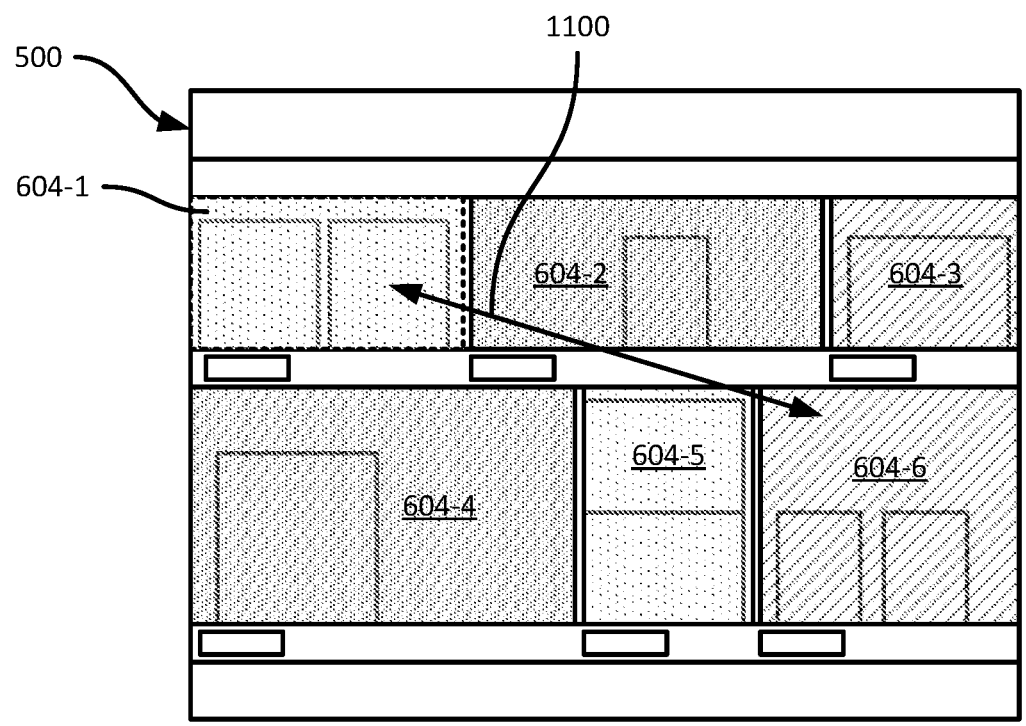
FIG. 11 is a diagram illustrating an example performance of block 345 of the method of FIG. 3 after the performance of the method of FIG. 10.

At block 1050, once no further support surfaces 417 remain to be processed, the server 101 returns the selected relocation indicators from successive performances of block 1035, for use in the method 300. Specifically, at block 345 the image 500 may be displayed along with the overlay regions 604 and any relocation indicators arising from the method 1000. Turning to FIG. 11, the image 500 and overlay regions 604 are illustrated, along with a relocation indicator 1100 suggesting a swap of the items 112-1 and 112-6. If such a swap is executed, subsequent performances of the method 300 enable the server 101 to assess the impact of such a swap on the performance metrics of the items 112-1 and 112-6.

In other examples, the generation of relocation indicators via the method 1000 may operate on groups of items 112, rather than individual items 112 as described above. For example, at block 1010 the first item selected can instead be selected support surface 117 or 417, containing a group of items 112. The selection at block 1015 therefore includes a second support surface 117 or 417, and the performance metrics compared at block 1020 can include the combined performance metrics for all items 112 on each of the first and second support surfaces.

In other examples, the first selected item can instead include a selected module 110 or 410, and the second selected item can include a second module 110 or 410, such that the performance metrics compared at block 1020 include the combined performance metrics of all items 112 on the selected modules 110 or 410. The relocation indicators generated via the method 1000 can therefore identify pairs of support surfaces, or pairs of modules, to swap (including all items 112 thereon), rather than pairs of individual items 112. First and second groups of items 112 selected for comparison via the method 1000 can also include categories of items 112, which may be specified in metadata associated with the items 112 in the repository 123.

Variations to the above systems and methods are contemplated. For example, at block 305, in addition to the image 500 the server 101 can receive a selection of an area on which to operate. That is, the image 500 may cover a portion of the facility, and the server 101 may receive a selection corresponding to a smaller portion within that portion. In such examples, the server 101 may restrict the remainder of the method 300 to the items 112 within the selected area.

In some examples, as will be apparent to those skilled in the art, an item 112 may be out of stock when an image is captured. In such examples, to avoid the omission of the relevant item 112 from the processing of the method 300, the server 101 can determine, e.g. at block 310, whether any out of stock (OOS) detections are associated with the image obtained at block 305. When an OOS detection is obtained along with the item detections 312, the server 101 generates a item region for the OOS item based on historical data indicating the location of the item (i.e. from an earlier performance of the method 300). Further, in such examples the server 101 can alter the image 500 prior to display at block 345, e.g. by replacing the portion of the image within the item region 502 with a corresponding portion of an earlier image in which the item 112 is present.

In further examples, the generation of item overlays at block 330 can include the generation of a plurality of overlays for each item 112. For example, the server 101 can be configured to generate a set of overlays for adjacent one-week periods (or any other suitable time period), rather than a single time period as discussed above. That is, the server 101 can retrieve and encode a performance metric for the item 112 for each of a series of contiguous weeks, months, or the like. A separate overlay may then be generated at block 330 for each encoded performance metric. Together, the series of overlays illustrate the variations in performance metrics associated with that item over time.

The server 101 can, at block 345, present the above-mentioned series of overlays in various ways. For example, the server 101 can present an animation containing the series of overlays for each item 112 in the image. For example, the overlays generated for a given time period (e.g. a week) may be presented for a predefined number of video frames, followed by a further predefined number of frames displaying the overlays for the subsequent period of time (e.g. the following week), and so on.

Figure 12:
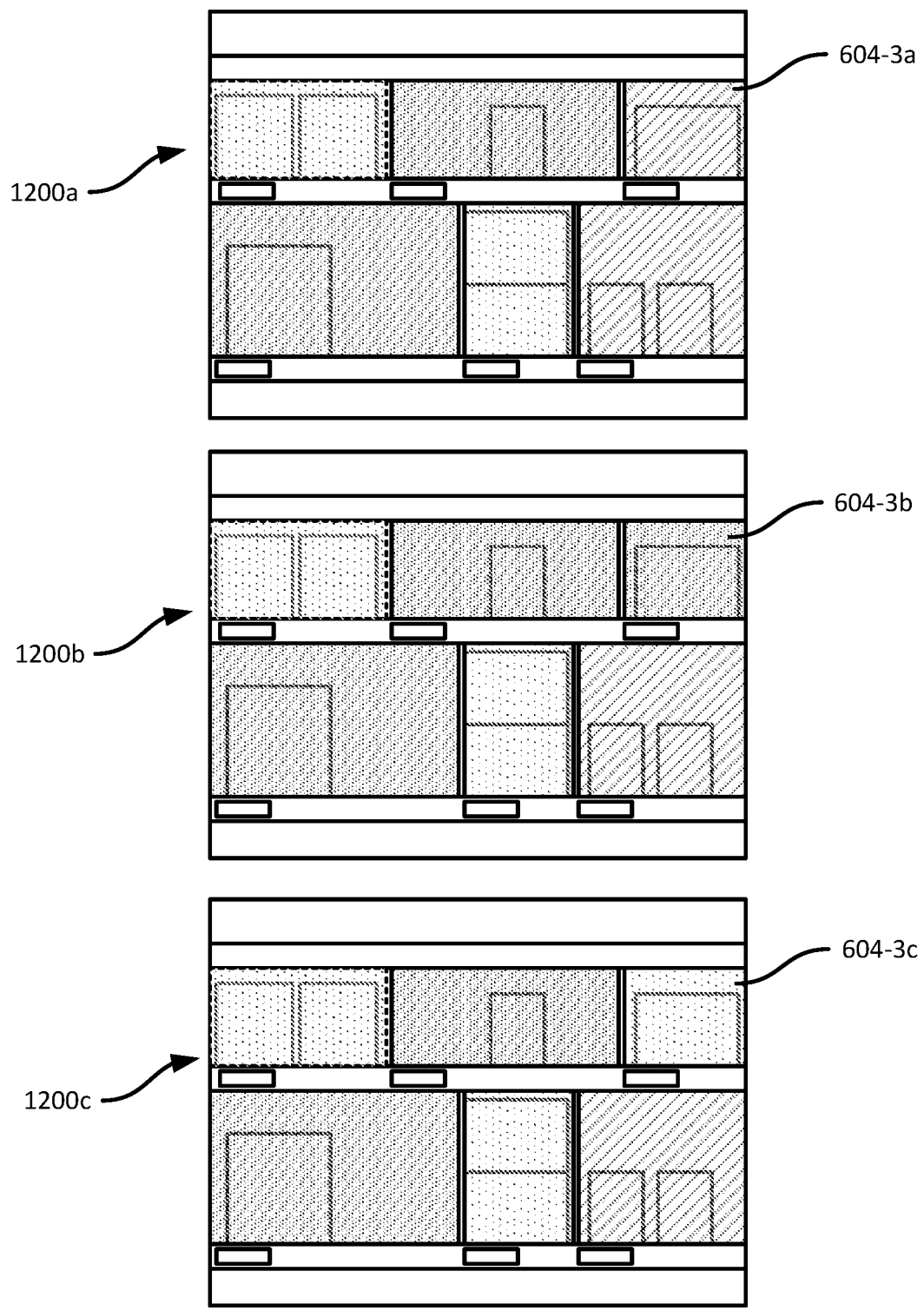
FIG. 12. is a diagram illustrating a set of overlays generated via successive performances of the method 300.

FIG. 12 illustrates a series of three sets of overlays 1200a, 1200b, and 1200c, corresponding to encoded performance metrics for the items 112 for three successive periods of time (e.g. equal periods, such as successive weeks). The sets 1200 may be presented at block 345 in an animation, for example. As seen in FIG. 12, all but one of the overlays remain unchanged over the successive time periods. The overlays 604-3a, 604-3b, and 604-3c, however, illustrate a decreasing performance metric associated with the underlying item 112.

In other examples, the server 101 may generate an additional overlay for each item 112, representing a rate of change of the performance metrics discussed above. That is, a rate of change in the performance metric obtained via successive performances of block 320 can be computed and encoded at block 325. For example, a positive or flat (i.e. zero) rate of change may be encoded as a first visual identifier, while a negative rate of change may be encoded as a second visual identifier. Additional visual identifiers may also be employed for more granular representations of the rate of change. The additional overlay can be presented at block 345, in addition to or instead of the overlays discussed earlier.

Figure 13:
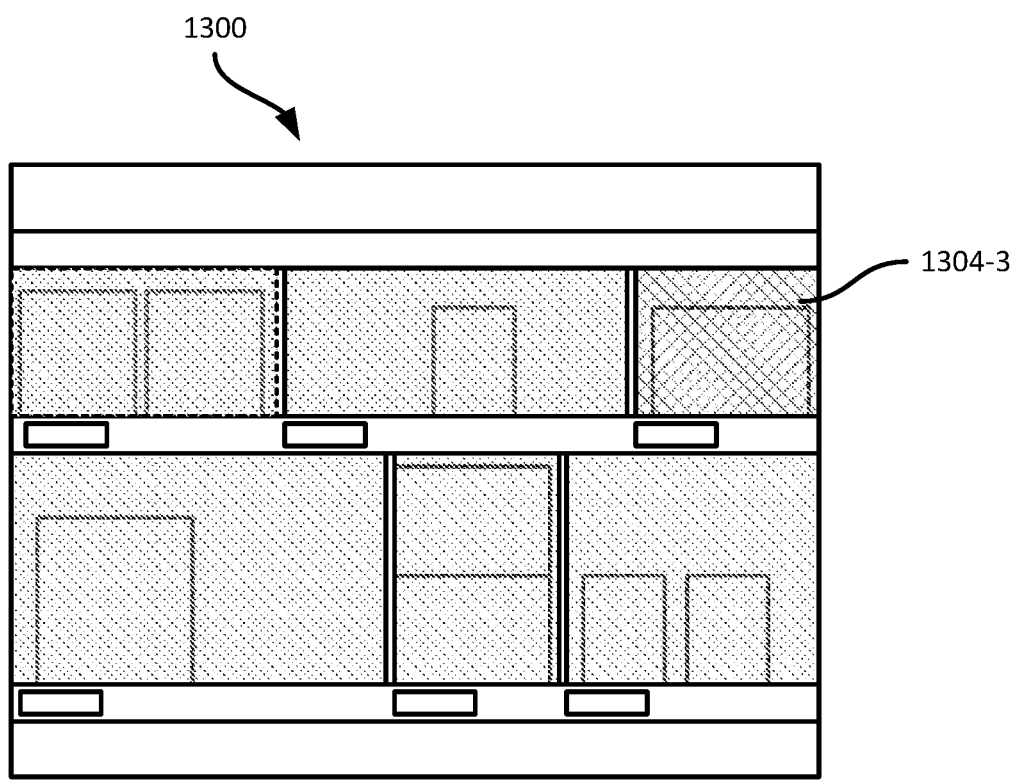
FIG. 13. is a diagram illustrating an additional item overlay corresponding to a rate of change in performance metrics.

Turning to FIG. 13, an example set of overlays 1300 is shown, in which each overlay illustrates the rate of change in performance metrics over the series from FIG. 12. That is, the overlays 1300 depict a performance metric trend over time (e.g. an occupancy trend), derived via the performance of the method 300. Thus, while all but one of the overlays 1300 employs a first visual identifier, indicating no change or positive change in this example, the overlay 1304-3 employs a second visual identifier, indicating a negative rate of change.

As will now be apparent to those skilled in the art, the system 100 as described above provides a technical improvement by way of processing image sensor data to determine accurate item locations, from which it computes and displays performance metrics for item location optimization, such as occupancy over time, item relocation indicators, as well as the above-mentioned heat maps.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
    obtaining, from an image sensor disposed in a facility, an image representing a plurality of items on a support structure in the facility;
    responsive to detection of the items in the image, for each item:
        obtaining an item region defining an area of the image containing the item;
        obtaining a performance metric corresponding to the item;
        encoding the performance metric as a visual attribute; and
        generating an item overlay using the visual attribute; and
    controlling a display to present the image and each of the item overlays placed over the corresponding item regions.

2. The method of claim 1, wherein obtaining the performance metric includes retrieving the performance metric from a repository.

3. The method of claim 2, wherein the performance metric includes an indication of revenue associated with the item over a time period.

4. The method of claim 1, wherein the item region defines a maximum capacity for the item on the support structure.

5. The method of claim 4, wherein obtaining the performance metric includes:
obtaining an occupied portion of the item region;
retrieving a previous occupied portion of the item region from a previously captured image; and
based on the occupied portion, the previous occupied portion, and a time period separating the image and the previous captured image, generating a rate of consumption for the item.

6. The method of claim 1, further comprising:
generating, based on a comparison of the performance metrics for at least a first item and a second item, a relocation indicator defining updated placements for the first item and the second item on the support structure; and
presenting the relocation indicator with the image and the item overlays.

7. The method of claim 1, wherein encoding the performance metric as a visual attribute includes selecting a color corresponding to the performance metric.

8. The method of claim 7, wherein encoding the performance metric as a visual attribute includes comparing the performance metric to an upper threshold corresponding to a first color, and a lower threshold corresponding to a second color.

9. The method of claim 1, further comprising, for each item:
determining a rate of change of the performance metric;
encoding the rate of change as an additional visual attribute; and
generating an additional item overlay using the additional visual attribute.

10. A computing device, comprising:
a communications interface, and;
a processor configured to:
obtain, from an image sensor disposed in a facility, an image representing a plurality of items on a support structure in the facility;
responsive to detection of the items in the image, for each item:
obtain an item region defining an area of the image containing the item;
obtain a performance metric corresponding to the item;
encode the performance metric as a visual attribute; and
generate an item overlay using the visual attribute; and
control a display to present the image and each of the item overlays placed over the corresponding item regions.

11. The computing device of claim 10, wherein the processor is configured to obtain the performance metric includes by retrieving the performance metric from a repository.

12. The computing device of claim 11, wherein the performance metric includes an indication of revenue associated with the item over a time period.

13. The computing device of claim 10, wherein the item region defines a maximum capacity for the item on the support structure.

14. The computing device of claim 13, wherein the processor is configured to obtain the performance metric by:
obtaining an occupied portion of the item region;
retrieving a previous occupied portion of the item region from a previously captured image; and
based on the occupied portion, the previous occupied portion, and a time period separating the image and the previous captured image, generating a rate of consumption for the item.

15. The computing device of claim 10, wherein the processor is further configured to:
generate, based on a comparison of the performance metrics for at least a first item and a second item, a relocation indicator defining updated placements for the first item and the second item on the support structure; and
control the display to present the relocation indicator with the image and the item overlays.

16. The computing device of claim 10, wherein the processor is configured, to encode the performance metric as a visual attribute, to select a color corresponding to the performance metric.

17. The computing device of claim 16, wherein the processor is configured, to encode the performance metric as a visual attribute, to compare the performance metric to an upper threshold corresponding to a first color, and a lower threshold corresponding to a second color.

18. The computing device of claim 10, wherein the processor is further configured to:
determine a rate of change of the performance metric;
encode the rate of change as an additional visual attribute; and
generate an additional item overlay using the additional visual attribute.

19. A system, comprising:
a communications interface;
an image sensor; and
a processor coupled to the communications interface and the image sensor, the processor configured to:
obtain, from the image sensor, an image representing a plurality of items on a support structure in the facility;
responsive to detection of the items in the image, for each item;
obtain an item region defining an area of the image containing the item;
obtain a performance metric corresponding to the item;
encode the performance metric as a visual attribute; and
generate an item overlay using the visual attribute; and
communicate the image and each of the item overlays placed over the corresponding item regions to a display.

20. The system of claim 19, wherein the image sensor is a fixed position camera disposed in a facility.

21. The system of claim 19, wherein the image sensor is disposed on a mobile automation apparatus configured to navigate the facility.

22. The system of claim 19, wherein the processor determines an occupancy trend of the item on the support structure as the performance metric based on the image from the image sensor and encodes the occupancy trend as the visual attribute.

23. The system of claim 19, wherein the processor causes the display to display a heat map of the item overlays on the support structure.

24. The system of claim 23, wherein the heat map is one of a color heat map and a pattern heat map.

\* \* \* \* \*